US008323548B2

(12) United States Patent
Lippert et al.

(10) Patent No.: US 8,323,548 B2

(45) Date of Patent: Dec. 4, 2012

(54) METHOD FOR MANUFACTURING A MULTILAYER COMPRESSION MOULDED ELEMENT

(75) Inventors: Hans Lippert, Lauterbach (DE); Thomas Weber, Leun (DE); Jens Lerch, Lauterbach (DE); Rainer Sperling, Biebertal (DE)

(73) Assignee: Schunk Kohlerstofftechnik GmbH, Heuchelheim (DE)

( * ) Notice: Subject to any disclaimer, the term of this patent is extended or adjusted under 35 U.S.C. 154(b) by 798 days.

(21) Appl. No.: 12/278,695

(22) PCT Filed: Jun. 6, 2006

(86) PCT No.: PCT/EP2006/005364

§ 371 (c)(1),
(2), (4) Date: Dec. 5, 2008

(87) PCT Pub. No.: WO2007/090435

PCT Pub. Date: Aug. 16, 2007

(65) Prior Publication Data

US 2009/0261687 A1 Oct. 22, 2009

(30) Foreign Application Priority Data

Feb. 8, 2006 (DE) ........................ 10 2006 006 313

(51) Int. Cl.
*B29C 39/12* (2006.01)

(52) U.S. Cl. ...................................... 264/255; 264/250

(58) Field of Classification Search ........................ None
See application file for complete search history.

(56) References Cited

U.S. PATENT DOCUMENTS

| | | | | |
|---|---|---|---|---|
| 3,601,645 | A * | 8/1971 | Whiteheart | 310/219 |
| 4,035,128 | A * | 7/1977 | Drostholm et al. | 425/259 |
| 5,701,046 | A * | 12/1997 | Kammerer et al. | 310/251 |
| 6,755,882 | B2 * | 6/2004 | Otani et al. | 75/231 |
| 7,294,166 | B2 * | 11/2007 | Otani et al. | 75/231 |
| 2003/0079340 | A1 | 5/2003 | Katoh et al. | |

FOREIGN PATENT DOCUMENTS

| | | | |
|---|---|---|---|
| GB | 1568241 A | | 5/1980 |
| JP | 07183075 | * | 7/1995 |

OTHER PUBLICATIONS

"PCT International Search Report dated Sep. 25, 2006 for PCT/EP2006/005364, from which the instant application is based," 2 pgs.
"International Preliminary Report on Patentability dated Sep. 9, 2008 for PCT/EP2006/005364, from which the instant application is based," 6 pgs.

* cited by examiner

*Primary Examiner* — Edmund H. Lee

(74) *Attorney, Agent, or Firm* — Fredrikson & Byron, P.A.

(57) ABSTRACT

The invention relates to a method and a device for manufacturing a multi-layer compression moulded element and to a compression moulded element which is embodied as a multi-layer carbon brush and has at least a first and a second moulding layer, in which, in order to carry out the method, a multi-component mould which comprises a moulding element and a mould slide arrangement interacts with a moulding die, and in which a mould which is defined by the selected configuration of the moulding slide arrangement in the moulding element is filled by filling moulding segments which are formed one next to the other with moulding material in chronological succession in a transverse direction with respect to the axis of the moulding die, and by the compression moulded element being subsequently formed by moving the moulding die and moulding slide arrangement relative to one another in the mould.

6 Claims, 5 Drawing Sheets

Figures 4A, 4B, 4C, 4D, 4E, 4F:
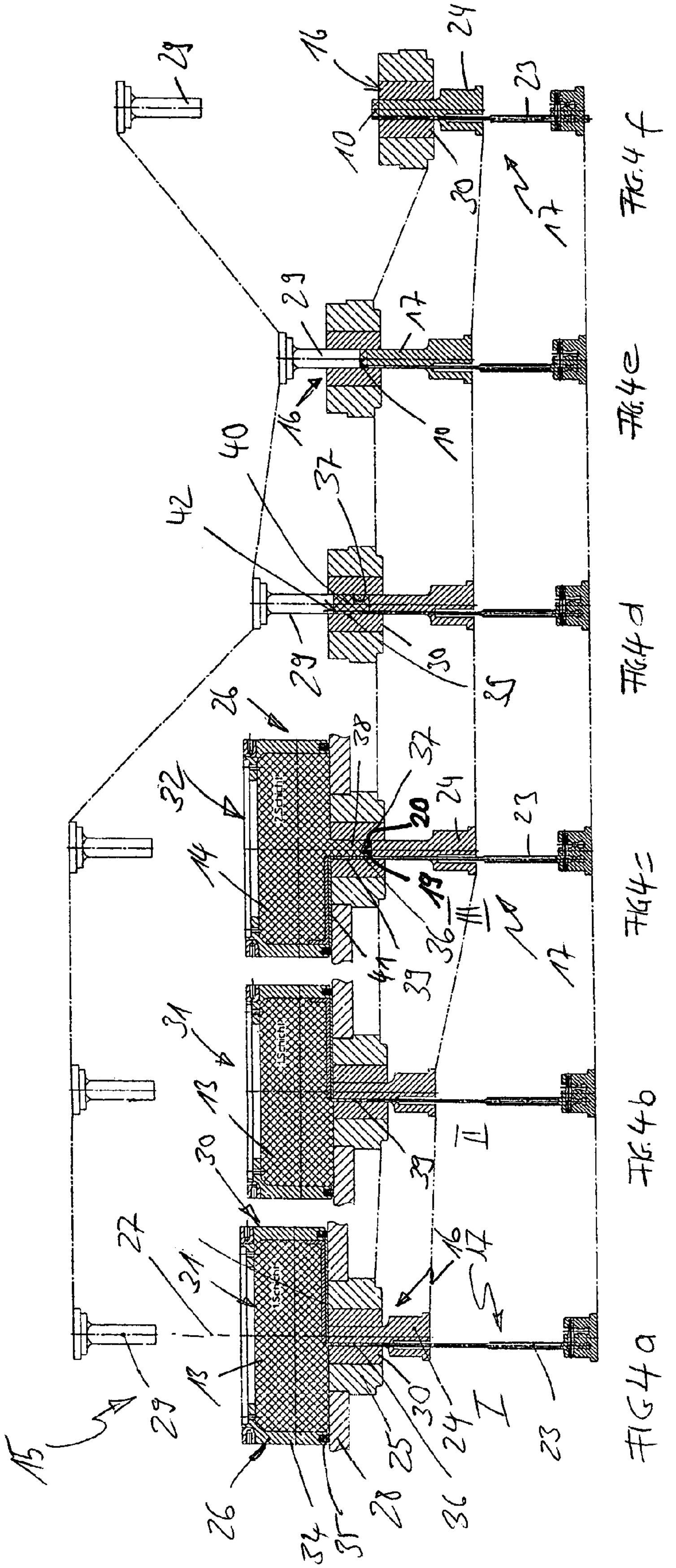

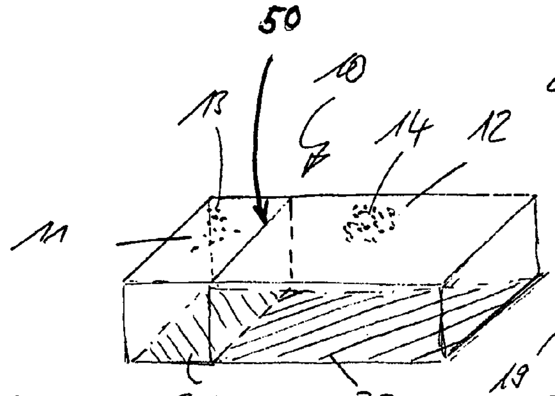
FIG. 1a
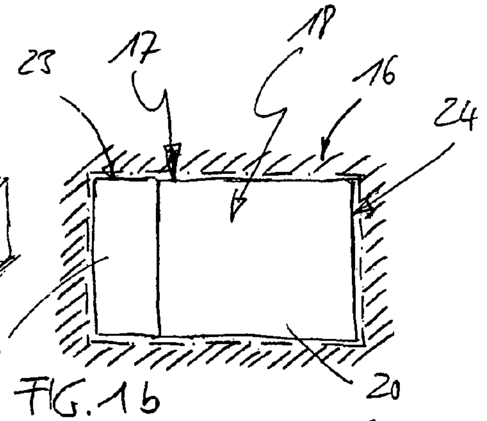
FIG. 1b
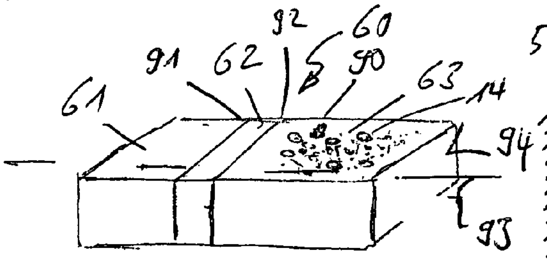
FIG. 2a
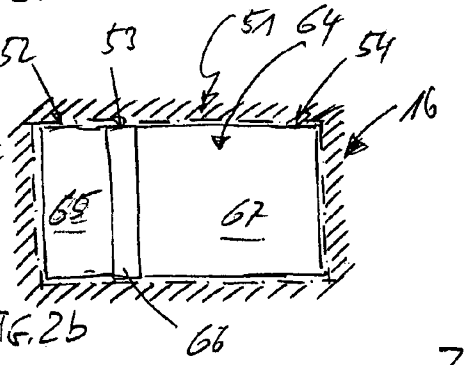
FIG. 2b
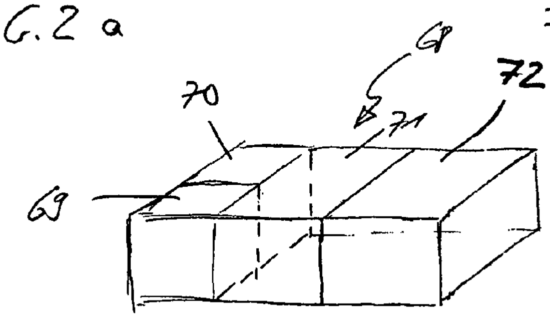
FIG. 3a
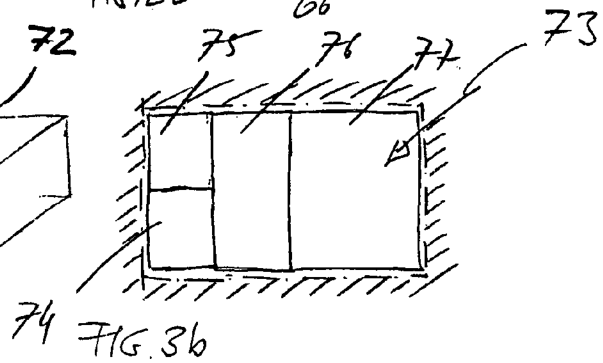
FIG. 3b
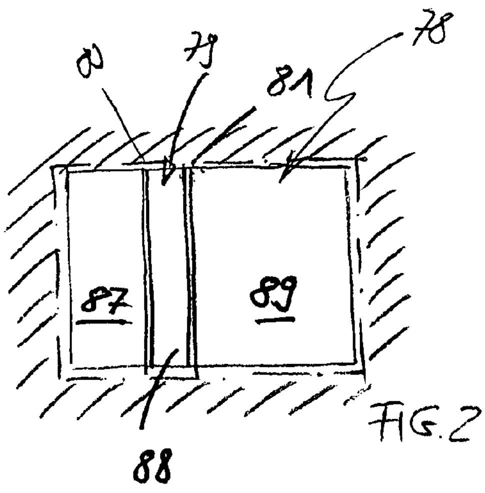
FIG. 2c
FIG. 1c
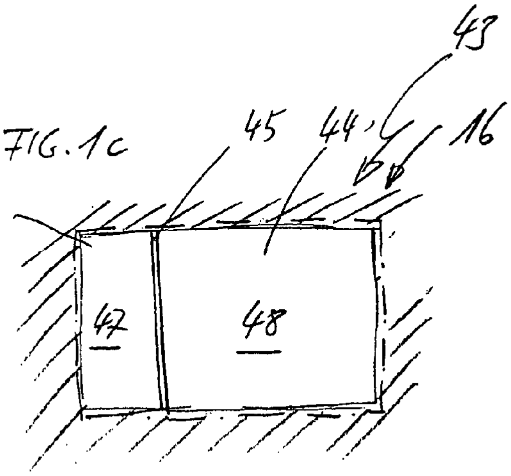

29
55
16
27
30
52
31
37
58
51
56
32
57
59
54
53
60

15
78
79
85
80
81
82
31
37
86
58
32
83
59
84

METHOD FOR MANUFACTURING A MULTILAYER COMPRESSION MOULDED ELEMENT

RELATED APPLICATIONS

This application is a 35 U.S.C. 371 national stage filing from International Application No. PCT/EP2006/005364 filed Jun. 6, 2006, which claims priority to German Application 10 2006 006 313.9 filed Feb. 8, 2006, the teachings of which are incorporated herein by reference.

The invention relates to a method for manufacturing a multi-layer compression moulded element having at least a first and a second moulding layer, wherein a multi-component moulding tool, which comprises a moulding element and a moulding slide arrangement, interacts with a moulding die, and the filling of the mould, which is defined by the selected configuration of the moulding slide arrangement in the moulding element, is carried such that moulding segments, which are formed one next to the other, are filled with moulding material in chronological succession in a transverse direction with respect to the axis of the moulding die, and subsequently the compression moulded element being formed by moving the moulding die and the moulding slide arrangement relative to one another in the mould. In addition, the invention relates to a device for manufacturing such a compression moulded element as well as to a multi-layer carbon brush, which can be manufactured by means of the above mentioned method.

Compression mould elements having a dual-layer structure are particularly known in the form of so-called "carbon brushes", which are used, for example, in the small motor technology as current-carrying connection parts, which allow a contact tapping at the collector of an electric motor. Since the carbon brushes have to allow a current tapping at the rotating collector as well as a secure electrical connection with electrical wire leads, specific requirements arise for the material composition of the carbon brushes which resulted in that the carbon brushes comprise a carbon portion substantially exclusively formed from compressed carbon particles, and a conductor connection portion substantially formed from compressed copper particles. A corresponding dual-layered structure of the carbon brushes is hence prior art.

The manufacturing of the known carbon brushes is carried out such that in a mould, the appropriate material volumes are filled and axially pressed against each other, such that a segment-type structure is the result, with moulding layers layered on top of each other in pressing direction. For the carbon brushes, the oriented pressing process results in an anisotropic electrical characteristic with a maximum electrical component resistance in the pressing direction, which corresponds to the current-conducting direction.

Since it is of vital importance for the electrical properties of carbon brushes that the electrical component resistance is particularly small, specifically in current-conducting direction, it was determined to manufacture dual-layer structured carbon brushes in a pressing process that allows a pressing direction transverse to the current-conducting direction, and hence transverse to the layer structure of the carbon brush. During the performance of corresponding tests it was found, however, that the application of known compression moulding technology does not result in manufacturing of multi-layer structured carbon brushes, which stand out through a special component quality and are also inexpensive to manufacture. In particular it was found that a layer structure with exactly defined dimensions and which is reproducible, is not possible with the known compression moulding technology.

The present invention is therefore based on the object to propose a method that allows the manufacturing of two- or multi-layered compression moulded parts with reproducible layer structure.

For solving this object, the method according to the invention has the features of claim 1.

In the method according to the invention for manufacturing a multi-layer compression moulded element having at least a first and a second moulding layer, a multi-component mould, which comprises a moulding element and a moulding slide arrangement, interacts with a moulding die, wherein the filling of the mould, which is defined by the selected configuration of the moulding slide arrangement in the moulding element, is carried such that moulding segments, which are formed one next to the other, are filled with moulding material in chronological succession in a transverse direction with respect to the axis of the moulding die, and subsequently the compression moulded element being formed by moving the moulding die and the moulding slide arrangement relative to one another in the mould.

The method according to the invention allows, due to the utilisation of a moulding slide arrangement, which is changeable in its configuration, the forming of defined moulding segments in the mould, which, in interaction with the filling of the moulding segments in chronological succession, allows the forming of moulding layers with exactly defined dimensions. The compression moulded elements manufactured by means of the method according to the invention are therefore exactly reproducible concerning their structure and comprise accordingly exactly defined electrical parameters.

For manufacturing of a multi-layer structured compression moulded element, it is advantageous when, for filling of the first moulding segment, first the moulding slide arrangement is transferred to a moulding slide configuration corresponding to the first moulding segment, and a first material reservoir with moulding material is associated to the first moulding segment, and subsequently, for filling of the second moulding segment, the moulding slide arrangement is transferred to a moulding slide configuration corresponding to the second moulding segment, and a second material reservoir with moulding material is associated to the second moulding segment, and hereinafter a joint compacting of the moulding segment fillings is carried out. The subsequently performed joint compaction process of the moulding layers, which were previously separately defined concerning their material volumes in the associated moulding segments, allows the forming of a boundary layer, which is defined with respect to the topography as well as to the position in the compression moulded element, between the moulding layers.

It is particularly advantageous, when, for changing of the moulding slide configuration, the relative arrangement of a plurality of moulding slide parts, which form as a whole the moulding slide arrangement, takes place, since thereby a particularly compact formation of the moulding slide arrangement is possible, which also allows the manufacturing of compression moulded elements with particularly small dimensions.

A particularly simple possibility for changing the moulding slide configuration arises when the moulding slide parts are moved coaxially to each other.

When the change of the moulding slide configuration for forming a moulding segment takes place after the arrangement of the associated filling chamber in a mould filling position, a mixing of different moulding materials which are provided for different moulding segments can be eliminated to the greatest extent.

It is particularly advantageous if the filling of at least one moulding segment is carried out such that first the moulding segment is formed oversize, and after filling of the moulding segment, an adjustment of the moulding segment to the desired moulding size is carried out. Hereby a precompaction of the moulding material arranged in the respective moulding segment is caused, which prevents, even upon direct contact with a moulding material volume arranged in an adjacent moulding segment, a mixing of the moulding materials associated to the different moulding layers during the subsequent compaction process.

If necessary, the risk of a mixing can additionally be reduced in that, during filling of a moulding segment, already filled moulding segments are provided with a cover.

The device according to the invention for manufacturing a multi-layer compression moulded element having at least a first and a second moulding layer includes a multi-component mould comprising a moulding element and a moulding slide arrangement and a moulding die arranged coaxial to the moulding slide arrangement, wherein the moulding slide arrangement is changeable concerning its configuration for forming a majority of moulding segments in the mould, and the moulding slide arrangement and the moulding die are movable relative to each other for opening and closing of the moulding tool.

The device according to the invention is therefore particularly suitable for the execution of the method according to the invention.

In a preferred embodiment, the moulding slide arrangement includes a majority of moulding slide parts, which are changeable concerning their relative arrangement, so that the configurability required corresponding to the forming of the desired moulding segments and, at the same time, a compact formation of the moulding slide arrangement is achieved.

Thereby, it is in particular preferred when the number of moulding slide parts corresponds to the number of moulding segments, since thereby the required configurability is achieved with the lowest number of components.

It is in particular advantageous for the handling of the moulding slide arrangement if the moulding slide parts, for changing their relative arrangement, are formed axially movable relative to each other.

In one embodiment, the moulding slide parts interact with the moulding element such that they define segment joint faces between the moulding segments.

In another embodiment, the moulding slide parts interact with the moulding element such that they define moulding segments.

In order to particularly ensure a clear association between the respective filling material and the associated moulding segment, it proves to be advantageous if, for filling the moulding segments with moulding material, on a side of the mould facing away from the moulding slide arrangement, a filling unit provided with a number of moulding segments corresponding to the number of filling chambers is provided. Thereby is also ensured that the filling unit and the moulding slide arrangement do not interfere with each other concerning their handling.

A particularly simple way of the positioning feed of the filling unit for the filling of the individual moulding segments in chronological succession arises if the filling unit is movable transverse to the axis of the moulding die.

The application of the method according to the invention, or the use of the device according to the invention, respectively, allows the manufacturing of a multi-layer carbon brush, which comprises according to the invention the features of claim 16.

The multi-layer carbon brush according to the invention is provided with at least one first moulding layer of a first moulding material and a second moulding layer of a second moulding material, wherein between two adjacent moulding layers and substantially parallel to a contact surface of the carbon brush, which is associated to a sliding contact surface of a commutator unit of an electric motor, a layer joint face is formed. Thereby, the contact moulding layer serving for forming the contact surface has abrasive properties. The multi-layer carbon brush, due to the defined separation between the moulding layers, with a layer joint face arranged in parallel to the contact surface, allows a break which is exactly defined in direction of the wear of the multi-layer carbon brush, which makes it possible to form the multi-layer carbon brush by means of an appropriate thickness dimension of the contact moulding layer in direction of the wear, such that the abrasive properties are only available until a defined wear is reached, which is determined by the position of the layer joint face.

Herewith the formation of the multi-layer carbon brush can be adjusted in a specific manner with respect to the desired running-in characteristic of the commutator unit or the desired roughness of the sliding contact surface of the commutator, respectively. It is, for example, possible that, depending on the surface quality of the commutator unit, the contact moulding layer, depending on the abrasive effect of the moulding material, can be selected concerning its dimensioning such that, after a desired number of rotations, the surface quality desired for the operation of the electric motor or the surface roughness of the sliding contact surface of the commutator, respectively, is achieved, and that, after reaching of the number of rotations, the contact moulding layer is used up by reaching of the layer joint face, so that subsequently, for the operation of the electric motor, a full surface contact between the contact surface of the multi-layer carbon brush and the commutator unit is given. Based on the possible differentiation with respect to the properties of the moulding materials used for the moulding layer, for the subsequent moulding layer now a moulding material can be selected, which is optimized with respect to its electrical properties.

It is proven to be particularly advantageous if the contact moulding layer has a carbon material with an abrasive aggregate to achieve an abrasive effect of the moulding layer while maintaining sufficient electrical qualities.

A particularly high abrasive performance can be achieved if, as an aggregate, an abrasive ceramic material is used.

A particularly high degree of reproducibility of the abrasive performance can be achieved if, for the aggregate, a homogenous distribution within the contact moulding layer is selected.

In particular, in the case when the running-in process, which serves for achieving a full surface contact between the multi-layer carbon brush and the commutator unit, is to be carried out in multiple phases, wherein in the different phases different abrasive performances are to be achievable, it is of advantage, if an adjacent moulding layer, which is arranged adjacent to the contact moulding layer and separated by the layer joint face, also has abrasive properties. Thereby, the abrasive properties of the adjacent moulding layer can be generated in the same manner as described above with respect to the contact moulding layer.

The above described two- or multi-phase running-in process results, especially then, in good results, when the abrasive effect of the contact moulding layer is higher than the abrasive effect of the adjacent moulding layer, so that by means of the abrasive effect of the adjacent moulding layer a so-called "finish grinding" can be performed.

Hereinafter, preferred embodiments of the device, and method variants, which can be carried out therewith, as well as different embodiments of a multi-layer carbon brush are illustrated by means of the drawing in more detail.

Figures 5A, 5B, 5C, 5D, 5E, 5F:
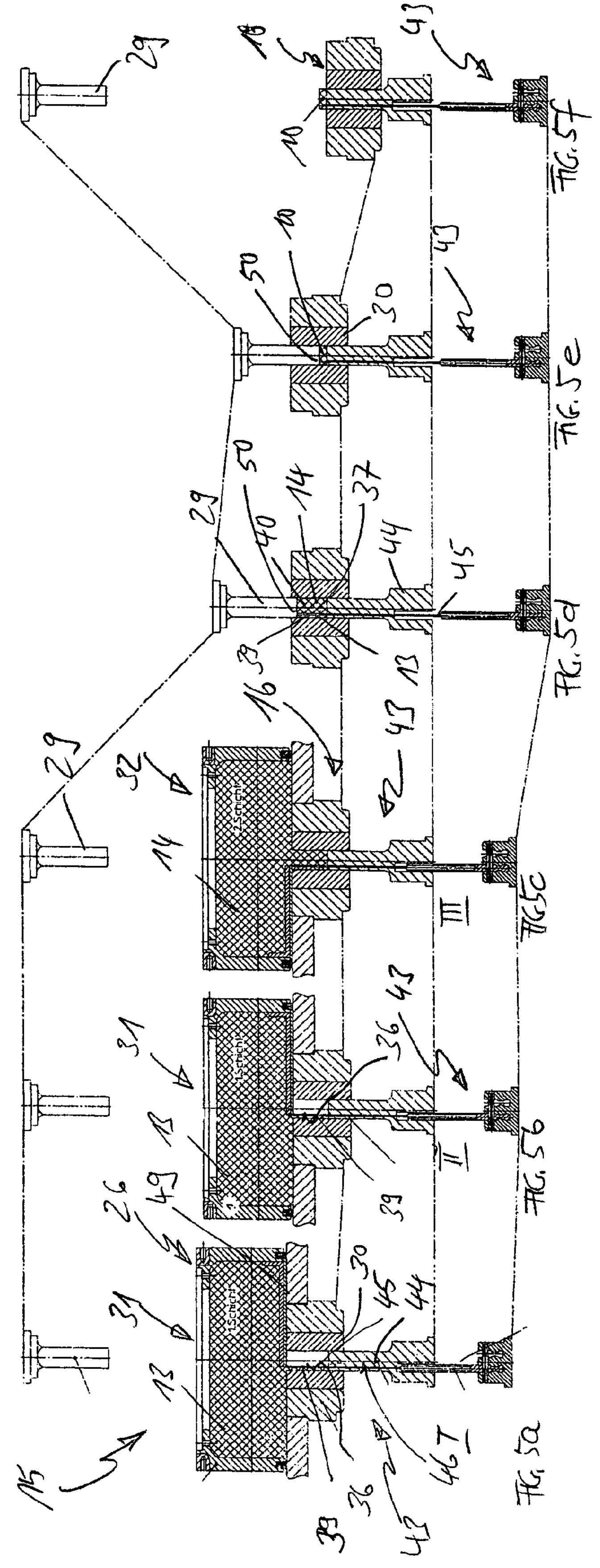
Figures 6A, 6B, 6C, 6D, 6E, 6F, 6G:
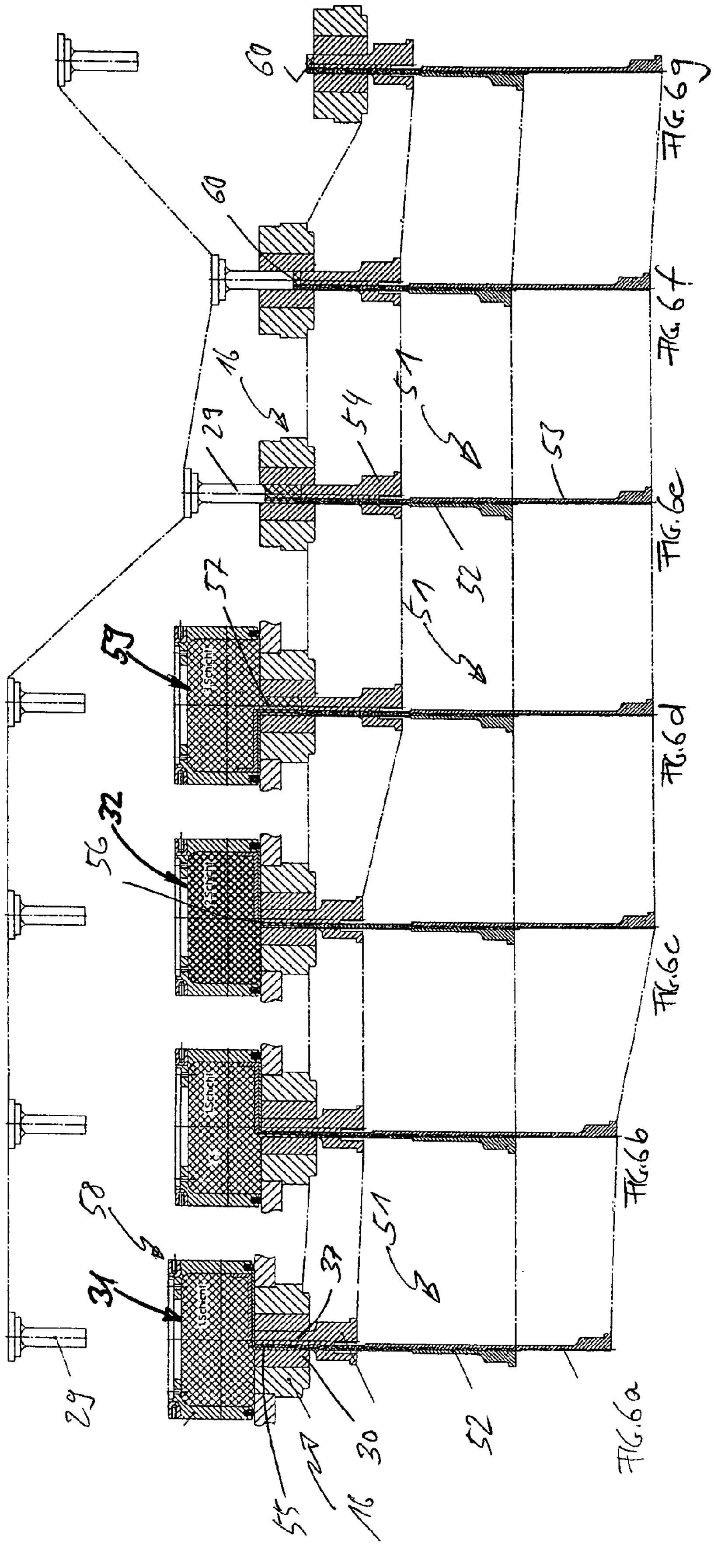
Figures 7A, 7B, 7C, 7D, 7E, 7F, 7G:
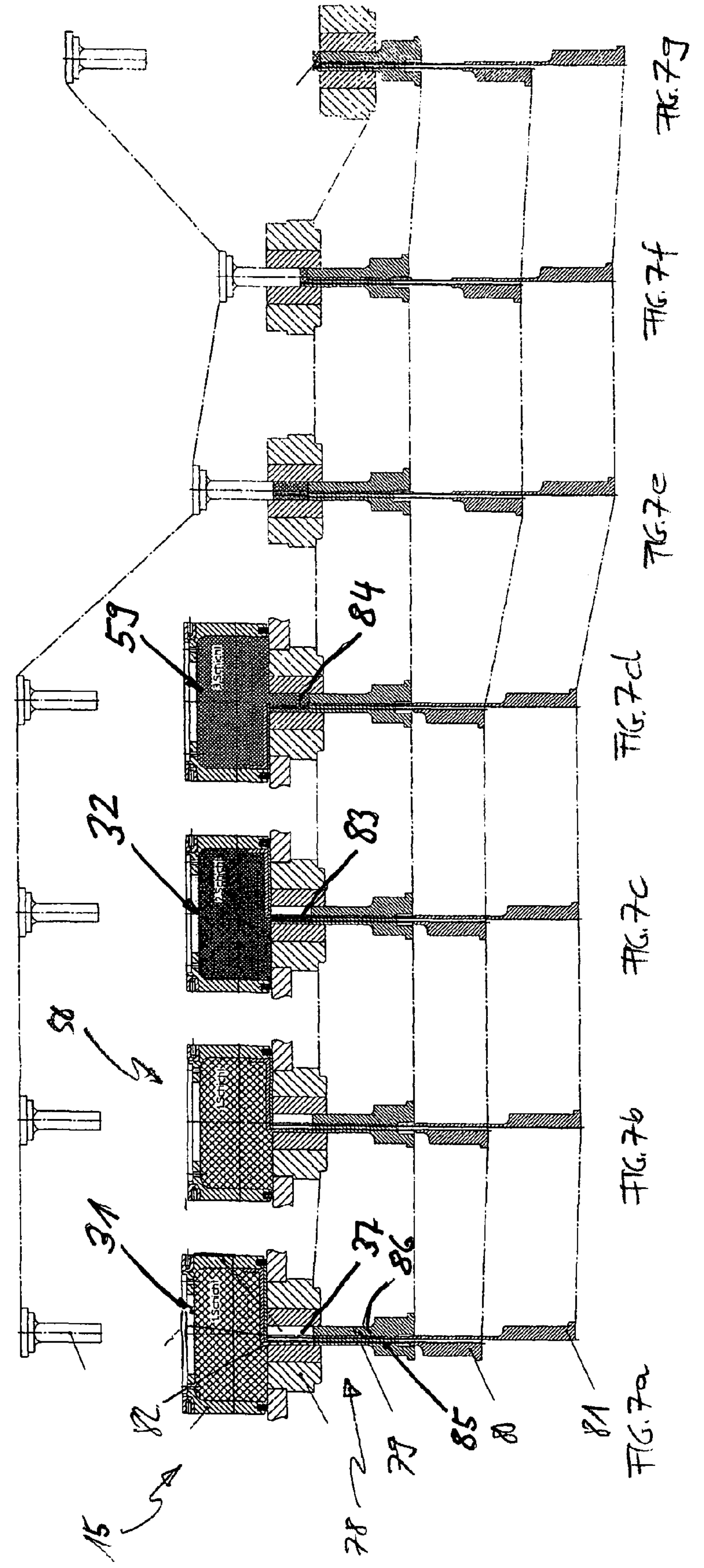

In the figures,

FIG. 1*a* shows a dual-layer carbon brush in a perspective illustration;

FIG. 1*b* shows a moulding slide arrangement arranged in a moulding tool for manufacturing of the carbon brush illustrated in FIG. 1*a* in a top view;

FIG. 1*c* shows a further embodiment of a moulding slide arrangement arranged in a moulding tool for manufacturing of the carbon brush illustrated in FIG. 1*a* in a top view;

FIG. 2*a* shows a three-layer carbon brush in a perspective illustration;

FIG. 2*b* shows a moulding slide arrangement for manufacturing of the carbon brush illustrated in FIG. 2*a* in a top view;

FIG. 2*c* shows a further embodiment of a moulding slide arrangement for manufacturing of the carbon brush illustrated in FIG. 2*a* in top view;

FIG. 3*a* shows a four-layer carbon brush in a perspective illustration;

FIG. 3*b* shows a moulding slide arrangement for manufacturing of the carbon brush illustrated in FIG. 3*a* in a top view;

FIG. 4*a* shows a moulding machine for manufacturing of the carbon brush illustrated in FIG. 1*a* with a moulding slide arrangement in a first configuration;

FIG. 4*b* shows the moulding slide arrangement illustrated in FIG. 4*a* in a second configuration;

FIG. 4*c* shows the moulding slide arrangement illustrated in FIG. 4*a* in a third configuration;

FIG. 4*d* shows the moulding machine illustrated in FIG. 4*a* at the beginning of a compaction phase;

FIG. 4*e* shows the moulding machine illustrated in FIG. 4*a* at the end of a compaction phase;

FIG. 4*f* shows the moulding machine illustrated in FIG. 4*a* in the de-moulding phase;

FIG. 5*a* shows a moulding machine with a moulding slide arrangement according to a second embodiment in a first configuration;

FIG. 5*b* shows the moulding slide arrangement illustrated in FIG. 5*a* in a second configuration;

FIG. 5*c* shows the moulding slide arrangement illustrated in FIG. 5*a* in a third configuration;

FIG. 5*d* shows the moulding machine illustrated in FIG. 5*a* at the beginning of the compaction phase;

FIG. 5*e* shows the moulding machine illustrated in FIG. 5*a* at the end of a compaction phase;

FIG. 5*f* shows the moulding machine illustrated in FIG. 5*a* in the de-moulding phase;

FIG. 6*a* shows a moulding machine for manufacturing of a carbon brush illustrated in FIG. 2*a* with a third embodiment of moulding slide arrangement in a first configuration;

FIG. 6*b* shows the moulding slide arrangement illustrated in FIG. 6*a* in a second configuration;

FIG. 6*c* shows the moulding slide arrangement illustrated in FIG. 6*a* in a third configuration;

FIG. 6*d* shows the moulding slide arrangement illustrated in FIG. 6*a* in a fourth configuration;

FIG. 6*e* shows the moulding machine illustrated in FIG. 6*a* at the beginning of the compaction phase;

FIG. 6*f* shows the moulding machine illustrated in FIG. 6*a* at the end of the compaction phase;

FIG. 6*g* shows the moulding machine illustrated in FIG. 6*a* in the de-moulding phase;

FIG. 7*a* shows a moulding machine for manufacturing of a carbon brush illustrated in FIG. 2*a* with a moulding slide arrangement in a fourth embodiment in a first configuration;

FIG. 7*b* shows the moulding slide arrangement illustrated in FIG. 7*a* in a second configuration;

FIG. 7*c* shows the moulding slide arrangement illustrated in FIG. 7*a* in a third configuration;

FIG. 7*d* shows the moulding slide arrangement illustrated in FIG. 7*a* in a fourth configuration;

FIG. 7*e* shows the moulding machine illustrated in FIG. 7*a* at the beginning of the compaction phase;

FIG. 7*f* shows the moulding machine illustrated in FIG. 7*a* at the end of the compaction phase;

FIG. 7*g* shows the moulding machine illustrated in FIG. 7*a* in the de-moulding phase.

FIG. 1*a* shows a compression moulded element formed dual-layered in a version as so-called dual-layer carbon brush 10 having a first moulding layer 11 and a second moulding layer 12. In the present case, the first moulding layer 11 is formed as a pure copper layer made of a plurality of copper particles 13, and the second moulding layer 12 is formed as a pure carbon layer made of a plurality of carbon particles 14. The manufacturing of the dual-layer carbon brush 10 illustrated in FIG. 1*a* is carried out according to a first variant by using a moulding machine 15 illustrated in the FIGS. 4*a* to 4*f* in successive manufacturing phases, which includes as part of a moulding tool 16 a moulding slide arrangement 17, the compression face arrangement 18 of which is illustrated in FIG. 1*b*. As a comparison of FIGS. 1*a* and 1*b* shows, the compression face arrangement 18 consists of two compression faces 19, 20, which correspond to the basic areas 21 and 22 of the moulding layers 11 and 12, respectively, in the dual-layer carbon brush 10.

The compression faces 19 and 20 are each formed by the free end faces of the moulding slide parts 23, 24, which form together, as illustrated in the FIGS. 4*a* to 4*f*, the moulding slide arrangement 17.

The moulding machine 15 illustrated in FIG. 4*a* comprises in addition to moulding tool 16 which is received in a mould carrier 25, a filling unit 26 arranged transverse to a compression axis 27 on a moulding table 28, and a moulding die 29. The filling unit 26 is located on the side of a mould 30 facing away from moulding slide arrangement 17 between the moulding die 29 and the moulding tool 16.

For manufacturing of the dual-layer compression moulded element, here formed as dual-layer carbon brush 10, the filling unit 26 includes a filling frame 34 with two filling chambers 31 (FIG. 4*a*), 32 (FIG. 4*c*) for reception and storing of the copper particles 13 and the carbon particles 14. The filling chambers 31, 32 of the filling unit 26 are formed arranged in a row perpendicular to the drawing plane, and are provided with an opening area 33 on their side facing the mould 30 or the moulding table 28, respectively.

In the configuration of the moulding machine 15 illustrated in FIG. 4*a*, the filling unit 26 with filling chamber 31, in which the copper particles 13 are contained, is in an overlapping position with the moulding tool 16. For transferring into the filling position illustrated in FIG. 4*a*, the filling unit 26 is provided at the lower edge of the filling frame 34 with a slide seal 35, which allows a sliding of the filling unit 26 on the moulding table 28 as well as a sealing of the filling frame 34 against the environment.

The moulding slide arrangement 17 is located in a filling configuration I, in which moulding slide part 23, for forming a first moulding segment 36 of a mould 37 formed as a cavity in the moulding element 30, is in a pulled-back position, and the moulding slide part 24 provided for forming of a second moulding segment 38 is in its position pushed into the mould 37. In the filling configuration I of the moulding slide arrangement 17, the copper particles 13 penetrate—should the situation arise, supported by the suction effect generated by back movement of the moulding slide part 23—into the moulding segment 36 and fill them up.

In a subsequently set pre-compacting configuration II, illustrated in FIG. 4*b*, caused by a slight pushing of the moulding slide part 23 into the moulding segment 36, a slight pre-compacting is carried out, which, depending on the cross section of a moulding particle column 39 formed in the moulding segment 36, allows a fixation of the moulding particle column 39, such that, as illustrated in FIG. 4*c*, in a second filling configuration III, the moulding slide part 24 can be pulled back for release of the second moulding segment 38 without the need to assume an additional stabilization of the moulding particle column 39 for prevention of a mixing with a moulding particle column 40 formed in the second moulding segment 38.

In the filling configuration III, illustrated in FIG. 4*c*, in which a filling of the second moulding segments 38 with carbon particles 14 takes place, the filling unit 26 is in an advanced position perpendicular to the drawing plane, in which the filling chamber 32 receiving the carbon particles 14 is arranged in an overlapping position with the moulding tool 16.

To prevent that an undesired mixing of the carbon particles 14 with the copper particles 13 occurs due to the feed motion of the filling unit 26 and the associated relative movement of the carbon particles 14 received in the filling chamber 32 with respect to the moulding particle column 39 formed from the copper particles 13 in the first moulding segment 36, in the exemplary embodiment illustrated here, the opening area 33 of the material chamber 32 is reduced by a cover 41, which covers the end cross section of the moulding particle column 39.

As FIG. 4*c* shows, the moulding slide parts 23, 24, which are axially movable relative to each other, are located in the filling configuration III in a relative positioning, in which the pressing faces 19, 20 are arranged flush.

Based on the filling configuration III, now as illustrated in FIG. 4*d*, a compaction of the moulding particle columns 39, 40, which are arranged next to each other in the mould 37, is carried out, wherein a layer joint face 42 formed between moulding particle columns 39, 40, until achievement of the complete compaction of the moulding particle columns 39, 40, illustrated in FIG. 4*e*, for forming the compression moulded element formed as dual-layer carbon brush 10, is maintained to the greatest extent with respect to its arrangement in the element as well as with respect to its topography.

After the completed compaction process, the moulding die 29 is moved out of the moulding tool 16 and by means of a complete pushing-in of the moulding slide arrangement 17 into the moulding element 30, the finished dual-layer carbon brush 10 is ejected out of the moulding tool 16.

In the FIGS. 5*a* to 5*f*, the manufacturing of the dual-layer carbon brush 10 illustrated in FIG. 1*a* is illustrated in correspondence with the above described figure sequence of the FIGS. 4*a* to 4*f*. Unlike the first method variant illustrated in the FIGS. 4*a* to 4*f*, in the method variant illustrated in the FIGS. 5*a* to 5*f*, a modified moulding slide arrangement 43 comprising two moulding slide parts 44 and 45 is used, wherein, as it follows also from the illustration according to FIG. 1*c*, the moulding slide part 45 is formed as a partition slide which is guided tongue-like in a guide slot 46 of the moulding slide part 44, and divides the end cross section of the moulding slide part 44 into the two compression faces 47 and 48.

In the configuration of the moulding machine 15 illustrated in FIG. 5*a*, the filling unit 26 with the material chamber 31, in which the copper particles 13 are received, is in an overlapping position with the moulding tool 16, analogue to the configuration of the moulding machine 15 illustrated in FIG. 4*a*.

The moulding slide arrangement 43 is situated in a filling configuration I, in which for forming of the first moulding segment 36 in the moulding element 30, the moulding slide part 44 is in a pulled-back position, and the moulding slide part 45 is completely pushed into the mould 37 until abutting against the front side of the cover 49 provided at the material chamber 31. In this configuration of the moulding slide arrangement 43, the moulding segment 36 is opened towards the material chamber 31 of the filling unit 26, so that the copper particles 13 can penetrate into the moulding segment 36 in order to fill it up. On the other hand, the second moulding segment 38 is covered by the cover 49, so that a penetrating of the copper particles 13 into the moulding segment 38 is prevented.

In the subsequently set pre-compacting configuration II, illustrated in FIG. 5*b*, a fixation, analogue to the precompaction described with reference to FIG. 4*b*, of the moulding particle column 39 formed in the first moulding segment 36, is carried out.

In the filling configuration III illustrated in FIG. 5*c*, analogue to the illustration in FIG. 4*c*, a filling of the second moulding segment 38 with carbon particles 14 from the material chamber 32 containing the carbon particles 14, which is brought in an overlapping position with the moulding tool 16 by means of an axial feed motion perpendicular to the drawing plane, is carried out.

Based on the filling configuration III, for achieving the compacting configuration illustrated in FIG. 5*d*, a moving-back of the moulding slide part 45, which acts as a partition slide between the moulding particle columns 39 and 40, is now carried out, wherein due to the above described precompaction of the moulding particle column 39, even after removal of the moulding slide part 45 from the mould 37, a mixing of the copper particles 13 with the carbon particles 14 does not happen.

The result of the complete compaction is, as illustrated in FIG. 5*e*, the dual-layer carbon brush 10 illustrated in FIG. 1*a* with a substantially planar formed layer joint face 50, which, with respect to its arrangement in the element as well as to its topography, is defined by the tongue-shaped moulding slide part 45.

In the figure sequences FIG. 6*a* to 6*g* and FIG. 7*a* to 7*g*, moulding slide arrangements 51 and 78 are illustrated, which are variants of the moulding slide arrangements 17 and 43, respectively, which are already described concerning their mode of function with reference to the figure sequences FIG. 4*a* to 4*f* and FIG. 5*a* to 5*f*, respectively.

Thus, in the moulding machine 15 illustrated in FIG. 6*a*, a moulding slide arrangement 51 is used, which, as illustrated in FIG. 2*b*, consists of the three moulding slide parts 52, 53 and 54 and accordingly allows a splitting of the mould 37 of the moulding tool 16 into three moulding segments 55 (FIG. 6*a*), 56 (FIG. 6*c*) and 57 (FIG. 6*d*), each of them defined with respect to their size and arrangement by the above mentioned moulding slide parts. The moulding slide arrangement 51 allows an execution of the method with a filling unit 58, which in addition to the filling chambers 31 (FIG. 6*a*), 32 (FIG. 6*c*) of the filling unit 26, includes a further filling chamber 59

(FIG. 6*d*). The filling chamber 59 can be filled with a moulding material other than copper particles 13 and carbon particles 14, corresponding to the desired layer composition of a three-layer moulding element 60, illustrated in FIG. 2*a* with moulding layers 61, 62 and 63.

The three-layer moulding element 60 illustrated in FIG. 2*a* can, for example, be structured such that for the moulding layer 61, copper particles 13, and for moulding layer 62, carbon particles 14 are selected, whereas for forming of the moulding layer 63, a mixture of carbon particles 14 and abrasive acting ceramic particles 90 is selected. The moulding layer 63 in the present case forms a contact moulding layer with a contact face 94, which, during use of the multi-layer carbon brush in an electric motor, abuts with a defined contact pressure against a sliding contact surface, which is not shown here in detail, of a commutator unit of the electric motor.

The multi-layer carbon brush, formed as three-layer moulding element 60, hence comprises in the above variant two layer joint faces 91 and 92, which, along a wear axis indicated with 93 in FIG. 2*a*, define exactly when, due to the progressive wear, a change of the electric or abrasive properties, respectively, of the multi-layer moulding element occurs.

FIG. 2*b* shows in a top view onto the end cross section of the moulding slide arrangement 51 a compression face arrangement 64 consisting of the respective end cross sections of the moulding slide parts 52, 53 and 54, with the compression faces 65, 66 and 67.

In the FIGS. 7*a* to 7*g*, the manufacturing of the three-layer moulding element 60 illustrated in FIG. 2*a* is illustrated in correspondence with the above described figure sequence 6*a* to 6*g*. In the moulding machine 15 illustrated in FIG. 7*a*, a moulding slide arrangement 78 is used, which consists of three moulding slide parts 79, 80 and 81, and accordingly allows a splitting of the mould 37 of the moulding tool 16 into three moulding segments 82 (FIG. 7*a*), 83 (FIG. 7*c*) and 84 (FIG. 7*d*), each of them defined concerning size and arrangement by the above mentioned moulding slide parts. The moulding slide arrangement 78 allows, similar as the moulding slide arrangement 51, the execution of the method with the filling unit 58, which, in addition to the filling chambers 31, 32 of the filling unit 26, has a further filling chamber 59.

In extension of the moulding slide arrangement 43 illustrated in the figure sequence 5*a* to 5*f*, the moulding slide arrangement 78 comprises two moulding slide parts 80, 81, which, formed as partition slides, are guided tongue-shaped in the guide slots 85, 86 (FIG. 7*a*) of the moulding slide part 79 and divide the end cross section of the moulding slide part 79, into three pressing faces 87, 88, 89 (FIG. 2*c*).

FIG. 3*a* shows in a schematic illustration a compression moulded element 68, which consists in total of four moulding layers 69, 70, 71 and 72.

FIG. 3*b* shows the end cross section of a moulding slide arrangement 73 comprising four moulding slide parts 74, 75, 76 and 77, which is suitable for manufacturing the compression moulded element 68, and which allows, analogue to the above described method variants for manufacturing of the compression moulded elements illustrated in the FIGS. 1*a* and 2*a*, the manufacturing of the compression moulded element 68 illustrated in FIG. 3*a*.

The invention claimed is:

1. A method for manufacturing a multi-layer compression moulded element having at least a first moulding layer and a second moulding layer adjacent to the first mounding layer, The method comprising the steps of:

providing a multi-component moulding tool having a moulding element and a moulding slide arrangement selectively displaceable within the moulding element to define at least a first moulding segment when the moulding slide arrangement is in a first position and a second moulding segment when the moulding slide arrangement is in a second position, different than the first position;

providing a filling unit having a filling frame defining at least two filling chambers, the filling frame having a sliding seal;

providing a moulding die which is displaceable within the moulding element;

providing a moulding table on which the filling unit may slide in a direction transverse to a compression axis;

selectively positioning the moulding slide arrangement to define the first moulding segment;

filling the first moulding segment with moulding material from a first of the two filling chambers of the filling unit;

selectively positioning the moulding slide arrangement to define the second moulding segment;

sliding the filling unit in a direction transverse with respect to the axis of the moulding die so that the second of the two filling chambers of the filling unit fills the second moulding segment with moulding material;

forming the compression moulded element by moving the moulding die and the moulding slide arrangement towards one another in the mould to compact the moulded element;

removing the moulding die from the mould; and ejecting the compression moulded element from the mould by advancing the moulding slide arrangement.

2. The method according to claim 1, characterized in that at least for filling of the first moulding segment, the moulding slide arrangement is transferred to a moulding slide configuration corresponding to the first moulding segment, and a first filling chamber with moulding material is associated to the first moulding segment, and subsequently for filling of the second moulding segment, the moulding slide arrangement is transferred to a moulding slide configuration corresponding to the second moulding segment, and a second filling chamber with moulding material is associated to the second moulding segment, and subsequently a joint compacting of the moulding segment fillings is carried out.

3. The method according to claim 1, characterized in that for changing the moulding slide configuration, the relative arrangement of a plurality of moulding slide parts which form as a whole the moulding slide arrangement, is carried out.

4. The method according to claim 1, wherein the moulding slide arrangement comprises two elements that move coaxially with respect to each other.

5. The method according to claim 1, wherein the selective positioning of the moulding slide arrangement for forming one of the first and second moulding segments is carried out not until after the arrangement of the associated filling chamber in a mould filling position.

6. The method according to claim 1, characterized in that the filling of at least one moulding segment (36) is carried out such that the moulding segment first is formed oversize, and after filling of the moulding segment, an adjustment of the moulding segment to the moulding size is carried out.

* * * * *